United States Patent [19]

Dutzi et al.

[11] Patent Number: 6,059,276
[45] Date of Patent: May 9, 2000

[54] SINGLE COMPENSATING STABILIZER SYSTEM

[75] Inventors: Robert K. Dutzi, Buffalo Grove; Jason K. Trotter, Aurora, both of Ill.

[73] Assignee: Illinois Tool Works Inc., Glenview, Ill.

[21] Appl. No.: 09/041,167

[22] Filed: Mar. 12, 1998

[51] Int. Cl.$^7$ ........................................................ F16F 1/00
[52] U.S. Cl. .................. 267/150; 267/293; 280/124.103; 280/124.106
[58] Field of Search ...................... 267/150, 292, 267/141.5, 293, 294; 280/124.106, 124.103, 124.177, 124.164, 124.1, 124.107, FOR 146, FOR 104, FOR 124

[56] References Cited

U.S. PATENT DOCUMENTS

| | | | |
|---|---|---|---|
| 2,045,028 | 6/1936 | Sellman . | |
| 2,643,897 | 6/1953 | Chowning . | |
| 2,755,100 | 7/1956 | Giacosa . | |
| 3,116,938 | 1/1964 | Stron . | |
| 3,537,696 | 11/1970 | Webster | 267/293 |
| 4,513,990 | 4/1985 | Morita et al. | 280/725 |
| 4,531,761 | 7/1985 | Von Sivers | 280/785 |
| 5,288,059 | 2/1994 | Gautheron et al. | 267/292 |
| 5,382,034 | 1/1995 | Parker et al. . | |
| 5,542,705 | 8/1996 | Parker et al. . | |
| 5,707,073 | 1/1998 | Stuker et al. | 280/89.11 |
| 5,732,969 | 3/1998 | Spoto | 280/183 |
| 5,836,598 | 11/1998 | Parker et al. | 280/93.51 |

FOREIGN PATENT DOCUMENTS

| | | |
|---|---|---|
| 0319391 | 6/1989 | European Pat. Off. . |
| 2616715 | 6/1987 | France . |
| 585140 | 4/1993 | Japan . |

*Primary Examiner*—Douglas C. Butler
*Assistant Examiner*—Robert A. Siconolfi
*Attorney, Agent, or Firm*—John P. O'Brien

[57] ABSTRACT

A stabilizer system including generally first and second pivotal components interconnected by at least one stabilizer member that dampens both compressive and tensile loads applied to the stabilizer member. The stabilizer member has opposing ends pivotally coupled to an upper anchor of one of the first and second pivotal components and a lower anchor of the other of the first and second pivotal components. The stabilizer member includes a resilient compressible member disposed in a housing between first and second substantially radial flanges of a linking member. The resilient compressible member is compressible between a first end portion of the housing and the second substantially radial flange when the housing and the linking member are in compression, and the resilient compressible member is compressible between a second end portion of the housing and the first substantially radial flange when the housing and the linking member are in tension.

26 Claims, 2 Drawing Sheets

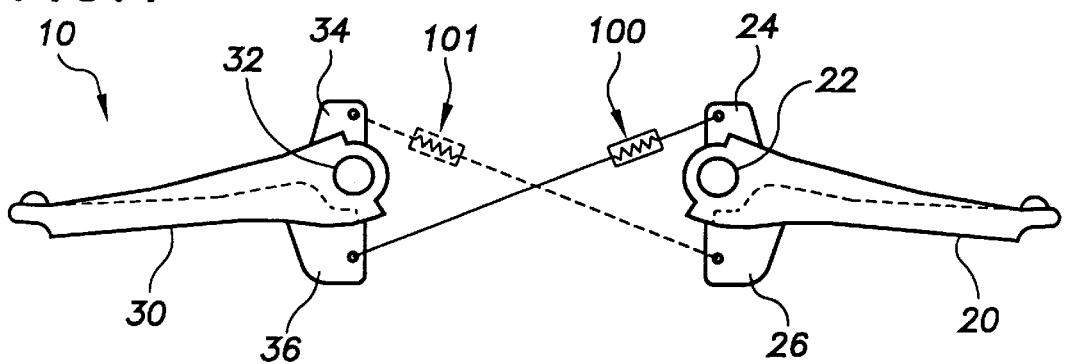
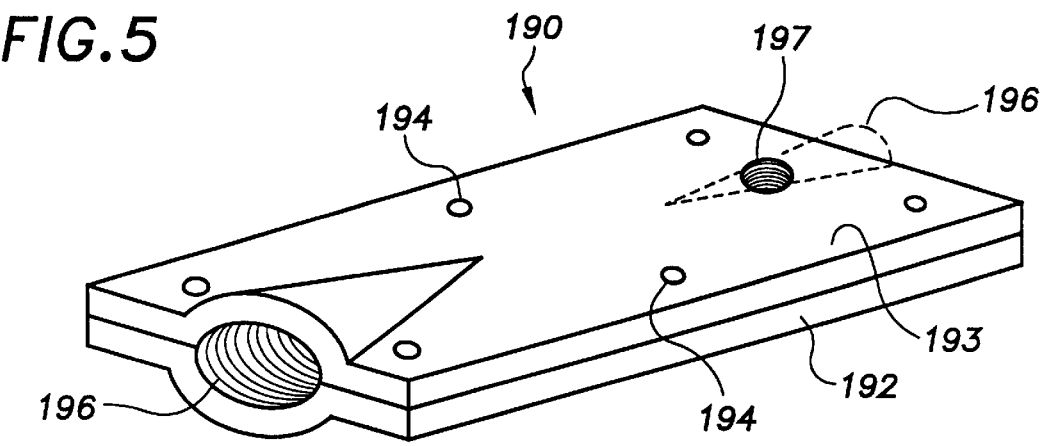
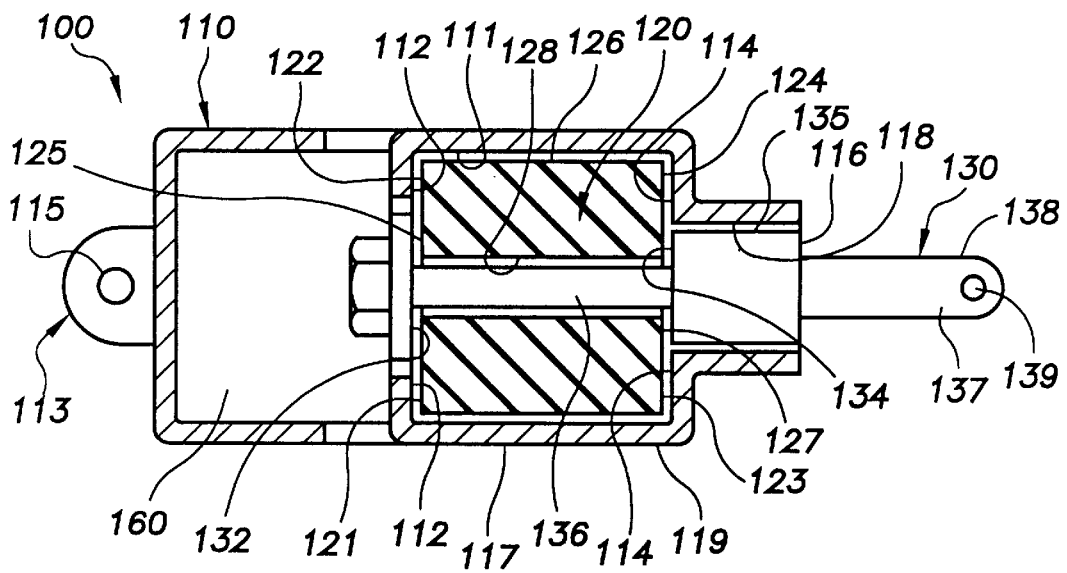

SINGLE COMPENSATING STABILIZER SYSTEM

CROSS-REFERENCE TO RELATED APPLICATIONS

The present application is related to U.S. application Ser. No. 08/689,881, filed Aug. 15, 1996, entitled "Direct Pull Dual Compensating Stabilizer System" and, now U.S. Pat. No. 5,732,969, U.S. application Ser. No. 08/798,875, filed Feb. 11, 1997, entitled "Apparatus For Vehicle Suspension Stabilization System And Method Therefor", now U.S. Pat. No. 5,836,598, both assigned commonly herewith and incorporated herein by reference.

BACKGROUND OF THE INVENTION

The invention relates generally to vehicle suspension stabilizer systems, and more particularly to stabilizer members useable for coupling first and second pivotable vehicle suspension components, and combinations thereof.

Recent advances in vehicle suspension systems include the replacement of conventional torsion type anti-roll, or stabilizer, bars with lighter weight components that more effectively reduce body roll and provide other advantages. The referenced Ser. No. 08/689,881, filed Aug. 15, 1996, entitled "Direct Pull Dual Compensating Stabilizer System" discloses a vehicle suspension stabilization system including an arrangement of crossed tension members interconnecting opposing pivotal suspension components to directly transfer energy between the pivotal suspension components without transferring energy through the vehicle frame. This system reduces vehicle body roll and provides improved dive and lift, or pitch, control thereby reducing oversteer and understeer, and improves overall handling performance generally.

U.S. application Ser. No. 08/798,875, filed Feb. 11, 1997, entitled "Apparatus For Vehicle Suspension Stabilization System And Method Therefor" discloses improved stabilizing members useable for coupling first and second pivotal suspension components in a vehicle suspension stabilization system, particularly systems of the type disclosed in U.S. application Ser. No. 08/689,881, filed Aug. 15, 1996, entitled "Direct Pull Dual Compensating Stabilizer System". The stabilizer members of these copending applications both include resilient compressible members, which are compressible when tensile forces are applied to the stabilizer member, but not when compressive forces are applied to the stabilizer member.

U.S. Pat. No. 2,755,100 issued Jul. 17, 1956 entitled "Rear Suspension For Motor Vehicles" discloses two symmetrically arranged cross assemblies interconnecting a drive axle and a vehicle frame. Each cross assembly includes an inner element with a disk on an end thereof telescopingly disposed in an outer element. A first rubber bushing on a distal side of the disk dampens compressive forces between the inner and outer elements, and a second rubber bushing on an opposing side of the disk dampens tensile forces between the inner and outer elements. This assembly however requires two rubber bushings, which are relatively costly.

The present invention is drawn generally toward advancements in the art of vehicle stabilizer systems having first and second pivotal components interconnected with at least one stabilizer member.

An object of the present invention is to provide novel vehicle stabilization, or stabilizer, systems and novel stabilizer members therefor that overcome problems in the prior art.

Another object of the invention is to provide novel stabilizer systems and novel stabilizer members therefor that are relatively lightweight, durable, economical, configurable with a single stabilizer member having a single resilient compressible member, and that utilize minimal space in the vehicle.

It is a further object of the invention to provide novel stabilizer systems and novel stabilizer members therefor that reduce vehicle roll, provide improved pitch control, isolate shock loads, and improve vehicle handling performance generally.

It is a more particular object of the invention to provide novel vehicle stabilizer systems wherein at least one stabilizer member is pivotally coupled to an upper anchor of one of first and second pivotal components and to a lower anchor of the other of the first and second pivotal components, whereby the stabilizer member dampens both compressive and tensile loads applied thereto.

It is another more particular object of the invention to provide novel stabilizer systems and novel stabilizer members therefor. The stabilizer member comprises generally a resilient compressible member disposed in a housing between first and second substantially radial flanges of a linking member. The resilient compressible member is compressible between a first end portion of the housing and the second substantially radial flange when the housing and the linking member are in compression, and the resilient compressible member is compressible between a second end portion of the housing and the first substantially radial flange when the housing and the linking member are in tension.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 1 is a partial elevation view of exemplary vehicle suspension stabilization system configurations according to the present invention.

FIG. 2 is a partial sectional view of a stabilization member according to an exemplary embodiment of the invention.

FIG. 5 is an exemplary linking member portion of a stabilizer member.

DETAILED DESCRIPTION OF THE INVENTION

Figure 3:
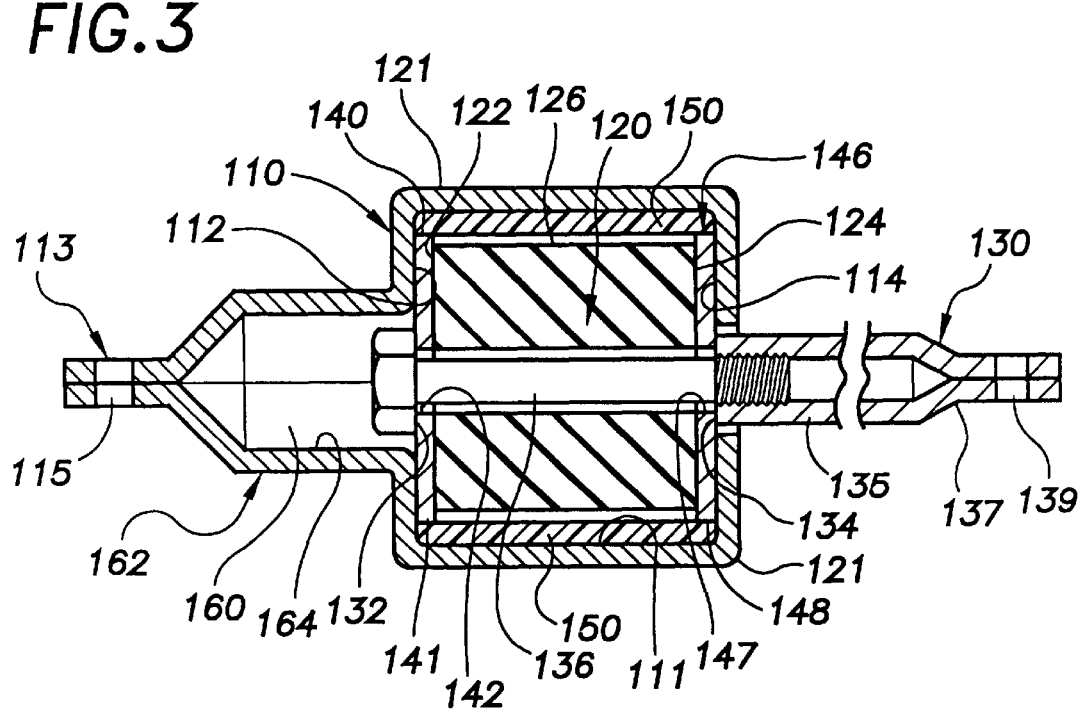
FIG. 3 is a partial sectional view of a stabilization member according to another exemplary embodiment of the invention.

FIG. 1 is a stabilizer system 10 for a vehicle having first and second pivotal components 20 and 30 pivotal about corresponding first and second pivot axes 22 and 32. The system 10 also includes at least one stabilizer member 100 pivotally interconnecting the pivotal components 20 and 30 above or below the pivot axes, as the particular application requires. The stabilizer member 100 includes generally a resilient compressible member for dampening compressive and tensile forces applied thereto as discussed further below. The pivotal components 20 and 30 are generally any pivotal members of a vehicle suspension or stabilizer system, and are preferably pivotal control arms of the vehicle. More generally, the stabilizer member 100 is useable to interconnect pivoting members, one of which may be non-pivoting or fixed, in systems other than vehicle suspension and stabilizer systems.

In one preferred vehicle stabilizer system illustrated in FIG. 1, one of the first and second pivotal suspension components 20 and 30 has an upper anchor 24 above its pivot axis 22, and the other of the first and second pivotal suspension components 20 and 30 has a lower anchor 36 below its pivot axis 32. According to this preferred configuration, a single stabilizer member 100 is pivotally interconnected, or coupled, between the upper anchor 24 of the pivotal suspension component 20 and the lower anchor 36 of the other pivotal suspension component 30. The ability of the stabilizer member 100 to compress, or dampen, in response to both compressive and tensile forces applied thereto permits the use of a single stabilizer member 100 in the system. Prior art systems utilizing stabilizer members that dampen only tensile forces require two stabilizer members as disclosed in the referenced copending applications.

The preferred stabilizer systems of the present invention, and more particularly the stabilizer members 100 thereof, require substantially less resilient compressible member material, which is a relatively costly component thereof. The first preferred system 10 having only a single stabilizer member 100 utilizes as much a one-half the resilient compressible member material in comparison to prior art systems utilizing two stabilizer members, substantially reducing system cost.

According to another preferred vehicle stabilizer system also illustrated in FIG. 1, each of the first and second pivotal suspension components 20 and 30 have a corresponding upper anchor 24 and 34 above its pivot axis 22 and 32 and a corresponding lower anchor 26 and 36 below its pivot axis 22 and 32. According to this other preferred configuration, a first stabilizer member 100 is pivotally coupled between the upper anchor 24 of the pivotal suspension component 20 and the lower anchor 36 of the other pivotal suspension component 30, and a second stabilizer member 101, shown in phantom, is pivotally coupled between the upper anchor 34 of the pivotal suspension component 30 and the lower anchor 26 of the other pivotal suspension component 20, whereby the first stabilizer member 100 crosses the second stabilizer member 101 without obstruction therebetween. The ability of the stabilizer members 100 and 101 to dampen both compressive and tensile forces applied thereto permits the use of as much as one-half the resilient compressible member material in each of the two stabilizer members 100 and 101 as is required in the other preferred embodiment of the present invention having only a single stabilizer member.

FIG. 2 illustrates the stabilizer member 100 including generally a housing 110 having a first end portion 112 and a second end portion 114 with an opening 116. A resilient compressible member 120 having a first end 122 and an opposing second end 124 is disposed between the first and second end portions 112 and 114 of the housing 110. More particularly, radial outer portions 121 and 123 of the first and second ends 122 and 124 of the resilient compressible member 120 are disposed between and engageable with the corresponding first and second end portions 112 and 114 of the housing 110.

FIG. 2 also illustrates a linking member 130 having a first substantially radial flange 132 disposed toward a first end portion thereof and a second substantially radial flange 134 spaced from the first substantially radial flange 132 by an axial portion 136 of the linking member 130. The resilient compressible member 120, and more particularly radial inner portions 125 and 127 on the first and second ends thereof, are disposed between the first and second substantially radial flanges 132 and 134 of the linking member 130.

In FIG. 2, the resilient compressible member 120 is compressible between the first end portion 112 of the housing and the second substantially radial flange 134 of the linking member 130 when the housing 110 and the linking member 130 are in compression. The resilient compressible member 120 is compressible between the second end portion 114 of the housing 110 and the first substantially radial flange 132 of the linking member 130 when the housing 110 and the linking member 130 are in tension.

FIG. 2 also illustrates the resilient compressible member 120 disposed at least partially about the axial portion 136 of the linking member 130 between the first substantially radial flange 132 and the second substantially radial flange 134. Generally, space is provided between the resilient compressible member 120 and an inner side wall 111 of the housing 110, and also preferably between the resilient compressible member 120 and the linking member 130, to allow for outwardly expansion of the resilient compressible member 120 when compressed as discussed above. Preferably, an outer side wall portion 126 of the resilient compressible member 120 does not contact the interior side wall 111 of the housing 110 when the compressible member 120 is compressed, reducing wear and extending the life thereof.

In one preferred embodiment, the resilient compressible member 120 is a substantially cylindrical member having an outer side wall 126 with a diameter less than a diameter of the housing inner side wall 111. The resilient compressible member 120 also has an axial bore 128 with a diameter greater than an outer diameter of the axial portion 136 of the linking member 130. The resilient compressible member 120 may also be pre-stressed by compressing it between one or both of the first and second housing end portions 112 and 114 and the first and second substantially radial flanges 132 and 134. In one embodiment, the resilient compressible member 120 is a urethane material, for example Irathane™.

Other compressible resilient materials may be used alternatively. The resilient compressible member 120 may for example be a coil spring or a thermoplastic material. The resilient compressible member 120 may be comprised of one or more components of the same or dissimilar materials arranged serially or parallely or combinations thereof. For example, a metallic coil spring may arranged in parallel with one or more urethane members to obtain a hybrid spring constant characteristic of both materials. Presently, the resilient compressible member 120 is preferably a single, cylindrically shaped urethane member. The physical properties and dimensions of the resilient compressible member 120 depend generally on the loads applied thereto in each particular application.

FIG. 2 also illustrates the second substantially radial flange 134 of the linking member 130 having an axial portion 138 extending therefrom and reciprocatably disposed in a complementarily configured sleeve portion 118 extending from the second end portion 114 of the housing 110 to axially align the linking member 130 therewith. The first substantially radial flange 132 of the linking member 130 and the first end portion 112 of the housing 110 may have a similar configuration.

FIG. 3 illustrates another exemplary stabilizer member 100 useable in a vehicle stabilization system. The stabilizer member 100 includes a first washer 140 disposed between the first end 122 of the resilient compressible member 120 and the first end portion 112 of the housing 110, and a second washer 146 disposed between the second end 124 of the resilient compressible member 120 and the second end portion 114 of the housing 110. In this alternative configuration, the axial portion 136 of the linking member 130 is a bolt shaft, and the first substantially radial flange 132 is a bolt head, and more particularly the clamping surface thereof. The second substantially radial flange 134 is an end portion of an elongate rigid member 135, which may be a rigid rod or tubular member, coupled to a threaded bolt shaft portion.

In FIG. 3, the first substantially radial flange 132 is engageable with the first washer 140 to compress the resilient compressible member 120 between the first washer 140 and the second end portion 114 of the housing 110 when the housing 110 and the linking member 130 are in tension. The second substantially radial flange 134 is engageable with the second washer 146 to compress the resilient compressible member 120 between the second washer 146 and the first end portion 112 of the housing 110 when the housing 110 and the linking member 130 are in compression. The axial shaft portion 136 is free to reciprocate axially relative to one or the other of the first and second washers 140 and 146 during compression and tension between the housing 110 and linking member 130.

FIG. 3 illustrates the outer diameter 141 and 148 of the first and second washers 140 and 146 being preferably greater than the outer side wall diameter 126 of the resilient compressible member 120. An inner diameter 142 and 147 of the first and second washers 140 and 146 is preferably greater than or the same as the diameter of the axial bore 128 of the resilient compressible member 120. The inner diameter 142 and 147 of the first and second washers 140 and 146 however must be larger than the axial portion 136 of the linking member 130 to permit reciprocating action thereof relative to the first and second washers 140 and 146.

FIG. 3 also illustrates a guide member 150 disposed between the resilient compressible member 120 and the first and second washers 140 and 146 and the housing interior side wall 111. The guide member 150 is engageable with the outer diameters 141 and 147 of the first and second washers 140 and 146 to reduce wear and noise that may otherwise occur as a result of frictional contact directly between the washers and the housing inner side wall 111. The guide member 150 may be an acetal material.

FIGS. 2 and 3 illustrate the housing 110 further comprising a coupling member 113 toward the first end portion 112 thereof. The exemplary coupling member 113 is a flange member with an opening 115 for accommodating a bolt or other fastener, not shown but known generally, that pivotally couples the housing 110 to one of the pivotal suspension components 20 and 30 as discussed above.

FIGS. 2 and 3 also illustrate a compression cavity 160 disposed between the coupling member 113 and the first end portion 112 of housing 110. The compression cavity 160 accommodates the first substantially radial flange 132 and the axial portion 136 of the linking member 130 when the housing 110 and the linking member 130 are in compression. The compression cavity 160 of FIG. 3 is formed of a relatively constricted substantially cylindrical housing portion 162 with an inner diameter 164 sized to accommodate the bolt head forming the first substantially radial flange 132, whereby the substantially cylindrical housing portion 162 axially aligns and guides the linking member 130 relative to the housing 110.

Figure 4:
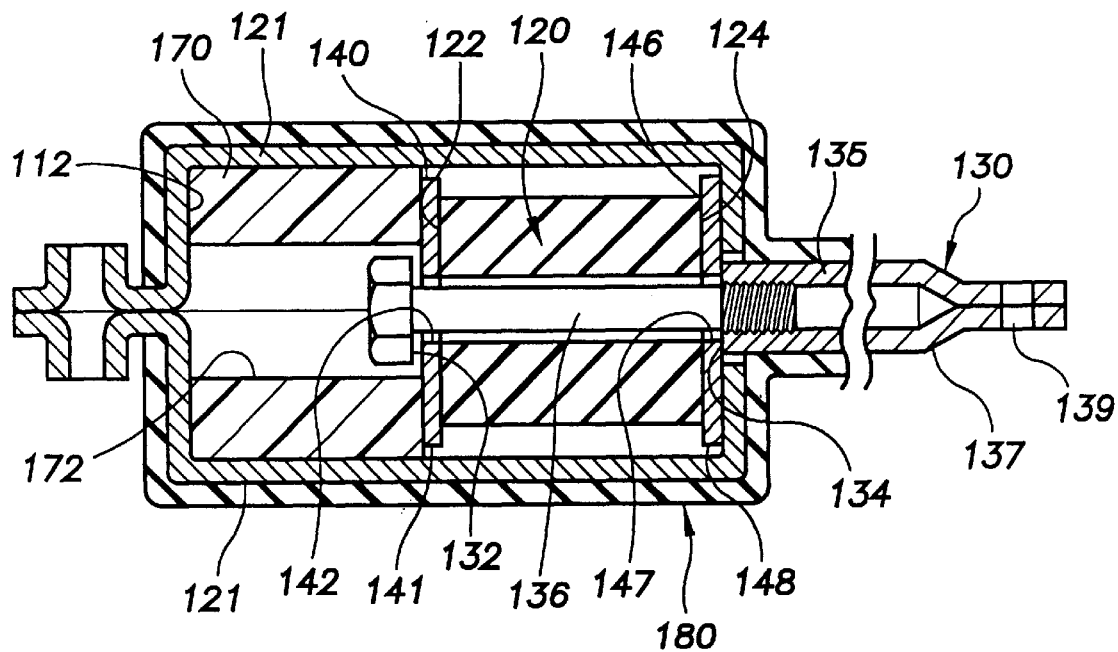
FIG. 4 is partial sectional view of a stabilization member according to yet another exemplary embodiment of the invention.

In the exemplary embodiment of FIG. 4, a rigid member 170 is disposed between the first end portion 112 of the housing 110 and the first washer 140, and the rigid member 170 includes an axial bore 172 for accommodating the first substantially radial flange 132 of the linking member 130 when the housing 110 and the linking member 130 are in compression. The inner diameter of the axial bore 172 is preferably sized to accommodate the bolt head forming the first substantially radial flange 132 and to axially align and guide the linking member 130 relative to the housing 110. The rigid member 170 may, for example, be a cylindrical member comprised of Delrin™, which also reduces or dampens frictional noise during reciprocating action of the linking member 130 in the axial bore 172 thereof.

In the exemplary embodiments of FIGS. 2–4, the housing 110 is a closed, substantially cylindrical member. In FIG. 2, the housing 110 is a substantially cylindrical member having a first portion 117 formed in a deep drawing operation, and a second stamped or cast end portion 119 welded or otherwise fastened to the deep drawn portion 117. In FIG. 2, the first end portion 112 of the housing 110 is a plurality of radially inwardly directed flange members formed in a stamping operation. In FIGS. 3 and 4, the housing 110 is a substantially cylindrical member having substantially identical first and second mirror image portions 121 formed in stamping operations. The portions 121 are fastened by welding or by fasteners or other known means.

FIG. 4 illustrates an encasement member 180 disposed about and sealingly encasing at least a portion of the housing 110 and at least a portion of the linking member 130. The encasement member 180 is preferably a closed cell foam material, which protects the stabilizer member 100 from the environment, reduces vibratory noise and reduces the possibility of interference with foreign objects. In one embodiment, the encasement member 180 is sealingly adhered to end portions of the stabilizer member 100 to permit unrestricted compression and expansion of the resilient compressible member 120 under tension and compression as discussed above. According to this aspect of the invention, intermediate portions, exclusive of the end portions, of the stabilizer member 100 are treated with a silicon lubricant or other release agent, which prevents adherence of the encasement member 180 thereto.

FIGS. 2–4 illustrate the linking member 130 having an end portion 137 with a fastener opening 139 for pivotally coupling the stabilizer member 100 to one of the pivotal suspension components 20 and 30. FIG. 5 is a perspective view of a rigid coupling member 190 formed of two plate members 192 and 193, which may be elongate, fastened by spot welds or other known fastening means 194, and having one or more threaded end portions 196 for engaging a threaded shaft portion, for example an opposing threaded end of a threaded rod coupled to a threaded bolt shaft forming the axial portion 136 of the linking member 130. The coupling member 190 may also include an opening 197 for pivotally coupling the stabilizer member 100 to one of the pivotal suspension components 20 and 30.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. A vehicle suspension stabilizer system having a stabilizer member coupling first and second pivotal components, the stabilizer member comprising:

a housing having a first end portion and a second end portion with an opening;

a resilient compressible member having a first end and an opposing second end, the resilient compressible member disposed between the first and second end portions of the housing;

a linking member having a first substantially radial flange disposed toward a first end portion of the linking member and a second substantially radial flange spaced from the first substantially radial flange by an axial portion of the linking member, the resilient compressible member disposed between the first and second substantially radial flanges of the linking member;

a first washer disposed between the first end of the resilient compressible member and the first end portion of the housing, a second washer disposed between the second end of the resilient compressible member and the second end portion of the housing, the first substantially radial flange engageable with the first washer to compress the resilient compressible member between the first washer and the second end portion of the housing when the housing and the linking member are in tension, and the second substantially radial flange engageable with the second washer to compress the resilient compressible member between the second washer and the first end portion of the housing when the housing and the linking member are in compression.

2. The stabilizer member of claim 1 further comprising a rigid member between the first end portion of the housing and the first washer, the rigid member having an axial bore for accommodating the first substantially radial flange of the linking member when the housing and the linking member are in compression.

3. The stabilizer member of claim 1, the axial portion of the linking member is a bolt, the first substantially radial flange is a head of the bolt, and the second substantially radial flange is an end portion of an elongate rigid member coupled to a threaded shaft portion of the bolt.

4. The stabilizer member of claim 1, the resilient compressible member is disposed at least partially about an axial portion of the linking member between the first substantially radial flange and the second substantially radial flange.

5. The stabilizer member of claim 4, the resilient compressible member is a substantially cylindrical member with an axial bore for accommodating the axial portion of the linking member, an outer diameter of the substantially cylindrical resilient compressible member less than an inner side wall diameter of the housing.

6. The stabilizer member of claim 1, the resilient compressible member is a urethane material.

7. The stabilizer member of claim 1, the housing further comprising a coupling member toward the first end portion of the housing, and a compression cavity between the coupling member and the first end portion of housing, the first substantially radial flange of the linking member movable into the compression cavity when the housing and the linking member are in compression.

8. The stabilizer member of claim 1, the housing is a closed, substantially cylindrical member.

9. The stabilizer member of claim 8, further comprising an encasement member disposed about and sealingly encasing at least a portion of the housing and at least a portion of the linking member.

10. A stabilizer system for a vehicle having first and second pivotal components pivotal about corresponding first and second pivot axes, the system comprising:

one of the first and second pivotal components having an upper anchor above its pivot axis, and the other of the first and second pivotal components having a lower anchor below its pivot axis;

a first stabilizer member having a first housing with a first end portion pivotally coupled to one of the upper anchor and the lower anchor of the first and second pivotal components, the first housing having a second end portion with an opening, the first stabilizer member having a first resilient compressible member with a first end and an opposing second end, the first resilient compressible member disposed between the first and second end portions of the first housing, the first stabilizer member having a first linking member with a first substantially radial flange disposed toward a first end portion of the first linking member and a second substantially radial flange spaced from the first substantially radial flange by an axial portion of the first linking member, the first resilient compressible member disposed between the first and second substantially radial flanges of the first linking member, the first linking member having a second end portion pivotally coupled to the other of the upper anchor and the lower anchor of the first and second pivotal components, the first resilient compressible member compressible between the first end portion of the first housing and the second substantially radial flange of the first linking member when the first housing and the first linking member are in compression, and the first resilient compressible member compressible between the second end portion of the first housing and the first substantially radial flange of the first linking member when the first housing and the first linking member are in tension.

11. The system of claim 10 further comprising a first washer disposed between the first end of the resilient compressible member and the first end portion of the housing, a second washer disposed between the second end of the resilient compressible member and the second end portion of the housing, the first substantially radial flange engageable with the first washer to compress the resilient compressible member between the first washer and the second end portion of the housing when the housing and the linking member are in tension, and the second substantially radial flange engageable with the second washer to compress the resilient compressible member between the second washer and the first end portion of the housing when the housing and the linking member are in compression.

12. The system of claim 11, further comprising a rigid member between the first end portion of the housing and the first washer, the rigid member having an axial bore for accommodating the first substantially radial flange of the linking member when the housing and the linking member are in compression.

13. The system of claim 11, the axial portion of the linking member is a bolt, the first substantially radial flange is a head of the bolt, and the second substantially radial flange is an end portion of an elongate rigid member coupled to a threaded shaft portion of the bolt.

14. The system of claim 10, the resilient compressible member is a substantially cylindrical member with an axial bore for accommodating the axial portion of the linking member, an outer diameter of the substantially cylindrical resilient compressible member less than an inner diameter of the housing.

15. The system of claim 10, the housing further comprising a coupling member toward the first end portion of the housing, and a compression cavity between the coupling member and the first end portion of housing, the first substantially radial flange of the linking member movable into the compression cavity when the housing and the linking member are in compression.

16. The system of claim 10, the housing is a closed, substantially cylindrical member.

17. The system of claim 16, further comprising an encasement member disposed about and sealingly encasing at least a portion of the housing and at least a portion of the linking member.

18. The system of claim 10, further comprising:
    each of the first and second pivotal components having a corresponding upper anchor above its pivot axis and a corresponding lower anchor below its pivot axis;
    a second stabilizer member having a second housing with a first end portion pivotally coupled to one of the upper anchor and the lower anchor of the first and second pivotal components, the second housing having a second end portion with an opening,
    the second stabilizer member having a second resilient compressible member with a first end and an opposing second end, the second resilient compressible member disposed between the first and second end portions of the second housing,
    the second stabilizer member having a second linking member with a first substantially radial flange disposed toward a first end portion of the second linking member and a second substantially radial flange spaced from the first substantially radial flange by an axial portion of the second linking member, the second resilient compressible member disposed between the first and second substantially radial flanges of the second linking member,
    the second linking member having a second end portion pivotally coupled to the other of the upper anchor and the lower anchor of the first and second pivotal components,
    the second stabilizer member pivotally coupled between the upper anchor of one of the first and second pivotal components and the lower anchor of the other of the first and second pivotal components, so that the second stabilizer member crosses the first stabilizer member,
    the second resilient compressible member compressible between the first end portion of the second housing and the second substantially radial flange of the second linking member when the second housing and the second linking member are in compression, and
    the second resilient compressible member compressible between the second end portion of the second housing and the first substantially radial flange of the second linking member when the second housing and the second linking member are in tension.

19. A stabilizer system for a vehicle having first and second pivotal control arms pivotal about corresponding first and second pivot axes, the system comprising:

one of the first and second pivotal control arms having an upper anchor above its pivot axis, and the other of the first and second pivotal control arms having a lower anchor below its pivot axis;

a stabilizer member having a housing with a first end portion pivotally coupled to one of the upper anchor and the lower anchor of the first and second pivotal control arms, the housing having a second end portion with an opening, the stabilizer member having a resilient compressible member with a first end and an opposing second end, the resilient compressible member disposed between the first and second end portions of the housing, the stabilizer member having a linking member with a first substantially radial flange disposed toward a first end portion of the first linking member and a second substantially radial flange spaced from the first substantially radial flange by an axial portion of the linking member, the resilient compressible member disposed between the first and second substantially radial flanges of the linking member, the linking member having a second end portion pivotally coupled to the other of the upper anchor and the lower anchor of the first and second pivotal control arms, the resilient compressible member compressible between the first end portion of the housing and the second substantially radial flange of the linking member when the housing and the linking member are in compression, and the resilient compressible member compressible between the second end portion of the housing and the first substantially radial flange of the linking member when the housing and the linking member are in tension.

20. A suspension member for dampening compression and tensile loads applied thereto, comprising:
    a housing having a first end portion and a second end portion with an opening;
    a resilient compressible member having a first end and an opposite second end, the resilient compressible member disposed between the first and second end portions of the housing;
    a linking member having a first flange disposed on a first portion thereof and a second flange disposed on a second portion thereof, the first flange spaced apart from the second flange, the resilient compressible member disposed between the first and second flanges of the linking member,
    a first portion of the first end of the resilient compressible member facing toward and compressible against the first end portion of the housing, a second portion of the first end of the resilient compressible member facing toward the first flange of the linking member,
    a first portion of the second end of the resilient compressible member facing toward and compressible against the second end portion of the housing, a second portion of the second end of the resilient compressible member facing toward the second flange of the linking member.

21. The suspension member of claim 20, a first washer disposed between the first end of the resilient compressible member and the first end portion of the housing, a second washer disposed between the second end of the resilient compressible member and the second end portion of the housing.

22. The suspension member of claim 20, the resilient compressible member disposed about an axial portion of the linking member, the first portions of the first and second ends of the resilient compressible member are radial outer end portions thereof, and the second portions of the first and second ends of the resilient compressible member are radial inner end portions thereof.

23. The suspension member of claim 22, first and second washers each having first and second opposite sides, the first and second washers disposed about the axial portion of the linking member, the first side of the first washer facing toward the first end of the resilient compressible member, the second side of the first washer having a radial inner portion facing toward the first flange of the linking member and a radial outer portion facing toward the first end portion of the housing, the first side of the second washer facing toward the second end of the resilient compressible member, the second side of the second washer having a radial inner portion facing toward the second flange of the linking member and a radial outer portion facing toward the second end portion of the housing.

24. The suspension member of claim 23, a rigid member between the first end portion of the housing and the first washer, the rigid member having an axial bore aligned axially with the linking member.

25. The suspension member of claim 20, a compression cavity disposed on the housing on a side of the first end portion thereof opposite the resilient compressible member, the compression cavity in alignment with the linking member.

26. The suspension member of claim 20, the resilient compressible member is a urethane material.

* * * * *